US012361881B2

(12) United States Patent
Zhou et al.

(10) Patent No.: US 12,361,881 B2
(45) Date of Patent: Jul. 15, 2025

(54) DISPLAY PANEL AND DISPLAY DEVICE

(71) Applicant: SHENZHEN CHINA STAR OPTOELECTRONICS SEMICONDUCTOR DISPLAY TECHNOLOGY CO., LTD., Guangdong (CN)

(72) Inventors: Xiang Zhou, Guangdong (CN); Weiyao Wei, Guangdong (CN); Baixiang Han, Guangdong (CN); Guangyao Li, Guangdong (CN)

(73) Assignee: SHENZHEN CHINA STAR OPTOELECTRONICS SEMICONDUCTOR DISPLAY TECHNOLOGY CO., LTD., Guangdong (CN)

( * ) Notice: Subject to any disclaimer, the term of this patent is extended or adjusted under 35 U.S.C. 154(b) by 0 days.

(21) Appl. No.: 18/428,742

(22) Filed: Jan. 31, 2024

(65) Prior Publication Data

US 2025/0201188 A1 Jun. 19, 2025

(30) Foreign Application Priority Data

Dec. 14, 2023 (CN) ........................ 202311729718.X

(51) Int. Cl.
*G09G 3/3233* (2016.01)
*G09G 3/3266* (2016.01)

(52) U.S. Cl.
CPC ......... *G09G 3/3233* (2013.01); *G09G 3/3266* (2013.01); *G09G 2300/0408* (2013.01);
(Continued)

(58) Field of Classification Search
None
See application file for complete search history.

(56) References Cited

U.S. PATENT DOCUMENTS

2008/0007499 A1* 1/2008 Kawabe ............... G09G 3/3291 345/82
2016/0343332 A1* 11/2016 Cao ........................ G11C 19/28
(Continued)

FOREIGN PATENT DOCUMENTS

DE 112014007252 T5 9/2017
DE 102022116240 A1 1/2023
DE 102022121350 A1 3/2023

OTHER PUBLICATIONS

Office Action issued in corresponding German Patent Application No. 10 2024 203556.4, dated Aug. 9, 2024, with English translation, 13 pages provided.

*Primary Examiner* — Dorothy Harris
(74) *Attorney, Agent, or Firm* — HSML P. C.

(57) ABSTRACT

A display panel comprises a display portion comprising sub-pixel rows and a gate driver circuit comprising gate driver units in cascade. Each sub-pixel row comprises sub-pixel units, and a pixel circuit comprising a switching transistor, a first reset transistor and a second reset transistor is provided in each sub-pixel unit. Each gate driver unit comprises first and second signal output terminals. Agate of the switching transistor in a b-th row is connected to the second signal output terminal of the gate driver unit at an a-th stage, a gate of the first reset transistor in the b-th row is connected to the first signal output terminal of the gate driver unit at a b-th stage, and a gate of the second reset transistor in the b-th row is connected to the first signal output terminal of the gate driver unit at a c-th stage.

16 Claims, 7 Drawing Sheets

(52) U.S. Cl.
CPC ............... *G09G 2300/0819* (2013.01); *G09G 2300/0842* (2013.01); *G09G 2310/0286* (2013.01); *G09G 2310/08* (2013.01)

(56) References Cited

U.S. PATENT DOCUMENTS

| | | | | |
|---|---|---|---|---|
| 2021/0201814 | A1* | 7/2021 | Choi | G09G 3/3275 |
| 2021/0280132 | A1* | 9/2021 | Gao | G09G 3/3233 |
| 2021/0343242 | A1 | 11/2021 | Wang et al. | |
| 2023/0008071 | A1* | 1/2023 | Heo | G09G 3/3291 |
| 2023/0105266 | A1* | 4/2023 | Hong | G09G 3/3233<br>345/212 |

* cited by examiner

DISPLAY PANEL AND DISPLAY DEVICE

CROSS-REFERENCE TO RELATED APPLICATION

The present disclosure claims priority to and the benefit of Chinese Patent Application No. 202311729718.X, filed on Dec. 14, 2023, the disclosure of which is incorporated herein by reference in its entirety.

TECHNICAL FIELD

The present disclosure relates to a field of display technology, and more particularly, to a display panel and a display device.

BACKGROUND

With the development of display technology, the conventional display device has a higher requirement for a narrow frame. Therefore, in the conventional display device, a gate driver on array (GOA) technology is used instead of a gate drive chip to narrow the frame.

Meanwhile, the pixel circuit in the conventional display panel generally is configured to receive three different control signals output from the gate driver circuit. The three different control signals are generally output from at least two different gate driver units in the same row. The gate driver units of increased number occupy a greater frame region of the display panel, which is contrary to the narrow frame requirement.

SUMMARY

An embodiment of the present disclosure provides a display panel and a display device to solve the technical problem that a wider frame occupied by an existing gate driver circuit is inconsistent with the requirement for a narrow frame.

An embodiment of the present disclosure provides a display panel including a display portion and a gate driver circuit located at a side of the display portion, wherein the display portion comprises a plurality of sub-pixel rows, each of the plurality of sub-pixel rows comprises a plurality of sub-pixel units, and a pixel circuit is provided in each of the plurality of sub-pixel units;

the pixel circuit comprises a switching transistor, a driver transistor, a first reset transistor and a second reset transistor, the switching transistor is connected to the driver transistor via a first reset node, the first reset transistor is connected to the driver transistor via the first reset node, and the second reset transistor is connected to the driver transistor via a second reset node;

the gate driver circuit comprises a plurality of gate driver units connected in cascade, each of the plurality of gate driver units comprises a first signal output terminal and a second signal output terminal, a gate of the switching transistor of the pixel circuit in a b-th row of the sub-pixel rows is connected to the second signal output terminal of the gate driver unit at an a-th stage, a gate of the first reset transistor of the pixel circuit in the b-th row of the sub-pixel rows is connected to the first signal output terminal of the gate driver unit at a b-th stage, and a gate of the second reset transistor of the pixel circuit in the b-th row of the sub-pixel rows is connected to the first signal output terminal of the gate driver unit at a c-th stage;

a is greater than b, b is greater than c, and a, b, and c are positive integers.

In the display panel of the present disclosure, a first control signal is output from the first signal output terminal and a second control signal is output from the second signal output terminal;

in one of scan frames of the gate driver circuit, a start time of the first control signal of the gate driver unit at the b-th stage is between a start time and an end time of the first control signal of the gate driver unit at the c-th stage, and a start time of the second control signal of the gate driver unit at the a-th stage is after an end time of the first control signal of the gate driver unit at the b-th stage.

In the display panel of the present disclosure, a pulse width of the first control signal is greater than a pulse width of the second control signal.

In the display panel of the present disclosure, a time period between the start time of the first control signal of the gate driver unit at the b-th stage and the end time of the first control signal of the gate driver unit at the c-th stage is a first time period, and a duration of the first time period is greater than a pulse width of the second control signal.

In the display panel of the present disclosure, the plurality of gate driver units further comprises a first dummy driver unit and a second dummy driver unit located before the gate driver unit at a first stage;

a first signal output terminal of the first dummy driver unit is connected to the gate of the second reset transistor of the pixel circuit in a first row of the sub-pixel rows, and a first signal output terminal of the second dummy driver unit is connected to the gate of the second reset transistor of the pixel circuit in a second row of the sub-pixel rows.

In the display panel of the present disclosure, a time period between the start time of the second control signal of the gate driver unit at the a-th stage and the end time of the first control signal of the gate driver unit at the b-th stage is a second time period, and a duration of the second time period is less than or equal to a pulse width of the second control signal.

In the display panel of the present disclosure, the gate driver unit includes:

a pull-up control unit connected to the first node and configured to pull up a potential of the first node;

a pull-up unit, wherein a terminal of the pull-up unit is connected to the first node, other terminal of the pull-up unit is connected to the first signal output terminal and the second signal output terminal, and the pull-up unit is configured to pull up potentials of the first signal output terminal and the second signal output terminal;

a pull-down unit connected to the first node and configured to pull down the potential of the first node;

a pull-down maintenance unit, wherein a terminal of the pull-down maintenance unit is connected to the first node, other terminal of the pull-down maintenance unit is connected to the first signal output terminal and the second signal output terminal, and the pull-down maintenance unit is configured to maintain a low-potential of the first node and pull down the potentials of the first signal output terminal and the second signal output terminal.

In the display panel of the present disclosure, the first node is connected to a first low-potential line through the pull-down unit, and the first signal output terminal and the second signal output terminal are connected to a second low-potential line through the pull-down maintenance unit;

a potential of the first low-potential line is less than a potential of the second low-potential line.

In the display panel of the present disclosure, the pull-up unit comprises a first pull-up transistor, a second pull-up transistor, and a third pull-up transistor;

the first pull-up transistor, the second pull-up transistor and the third pull-up transistor are all connected to the first node, a first electrode of the first pull-up transistor is connected to a first clock signal line, a second electrode of the first pull-up transistor is connected to a stage transmission signal terminal, a first electrode of the second pull-up transistor is connected to a second clock signal line, a second electrode of the second pull-up transistor is connected to the first signal output terminal, a first electrode of the third pull-up transistor is connected to a third clock signal line, and a second electrode of the third pull-up transistor is connected to the third signal output terminal;

a pulse width of a clock signal output by the first clock signal line is less than a pulse width of a clock signal output by the second clock signal line, and a pulse width of a clock signal output by the third clock signal line is less than a pulse width of a clock signal output by the first clock signal line.

The present disclosure also provides a display device including the display panel.

BRIEF DESCRIPTION OF THE DRAWINGS

The technical solution and other beneficial effects of the present disclosure will be apparent from the following detailed description of embodiments thereof, taken in conjunction with the accompanying drawings.

DETAILED DESCRIPTION

Technical solutions in embodiments of the present disclosure will be clearly and completely described with reference to the accompanying drawings in the embodiments of the present disclosure. It will be apparent that the described embodiments are only part, and not all, of the embodiments of the present disclosure. Based on the embodiments in the present disclosure, all other embodiments obtained by a person skilled in the art without involving any inventive effort are within the scope of the present disclosure.

Figure 1:
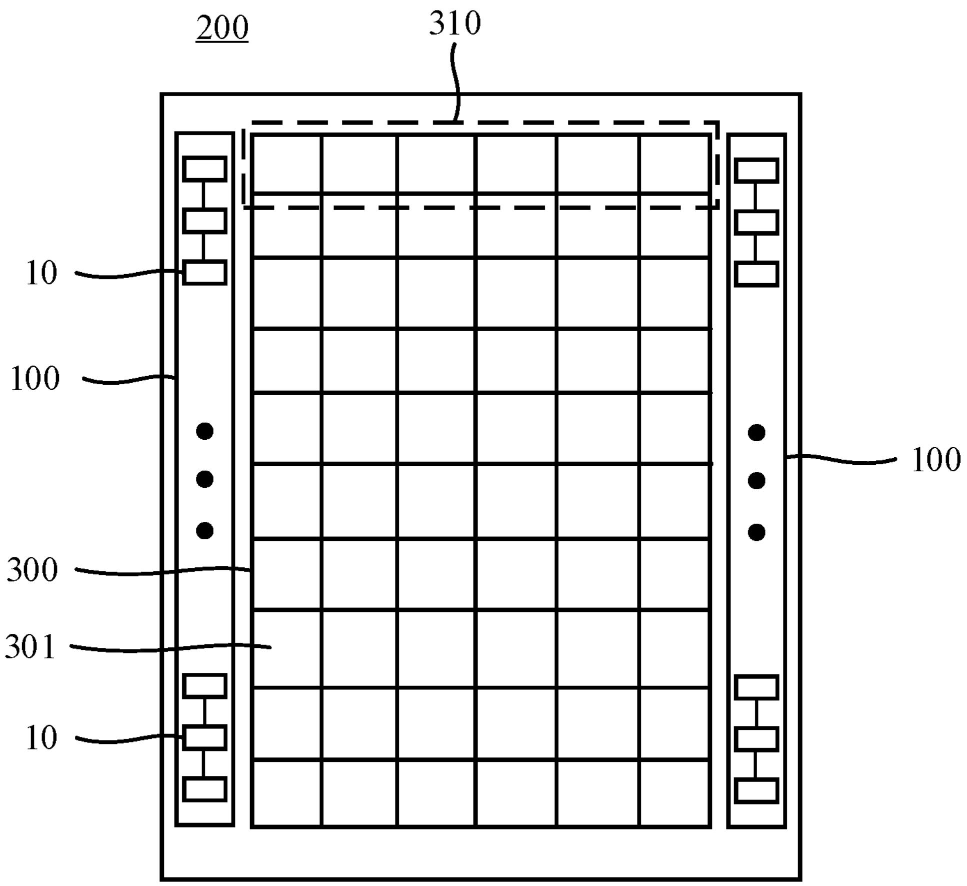
FIG. 1 is a schematic block diagram of a display panel according to an embodiment of the present disclosure.

Referring to FIG. 1, the present disclosure provides a display panel 200 including a gate driver circuit 100 and a display portion 300. The display panel 200 may include an organic light emitting diode display panel, a micro light emitting diode display panel, or the like.

Figure 2:
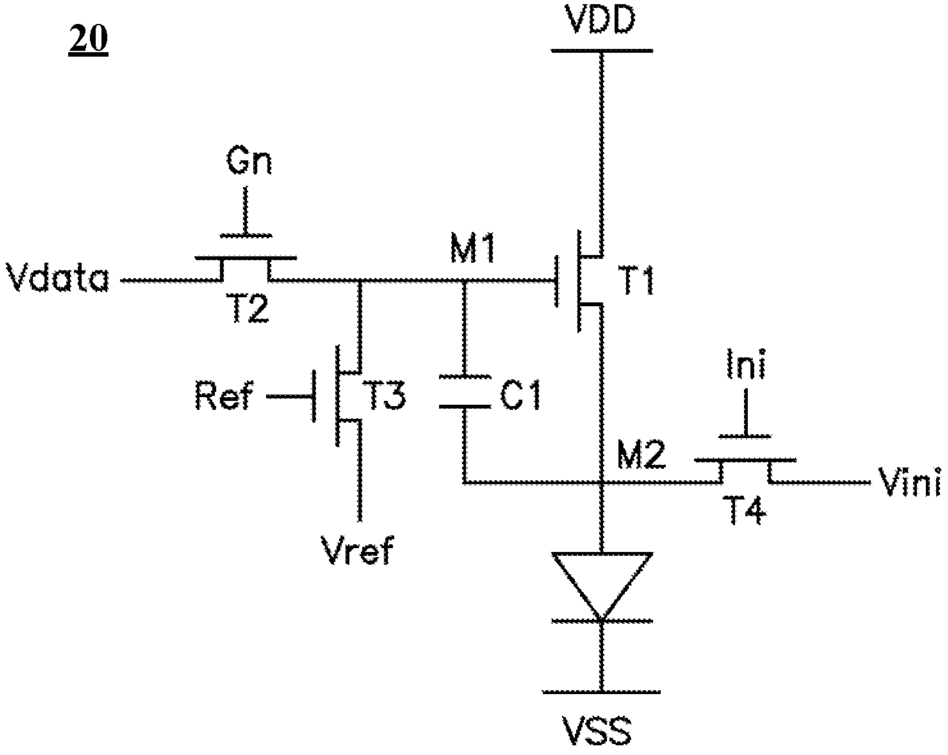
FIG. 2 is a block diagram of a pixel circuit according to an embodiment of the present disclosure.

Referring to FIGS. 1 and 2, the display portion 300 includes a plurality of sub-pixel rows 310. Each sub-pixel row 310 includes a plurality of sub-pixel units 301. Each sub-pixel unit 301 includes a pixel circuit 20. The pixel circuit 20 may include a first storage capacitor C1, a switching transistor T2, a driver transistor T1, a first reset transistor T3, and a second reset transistor T4. The switching transistor T2 is connected to the driver transistor T1 via a first reset node M1. The first reset transistor T3 is connected to the driver transistor T1 via the first reset node M1. The second reset transistor T4 is connected to the driver transistor T1 via a second reset node M2.

In an embodiment, a gate of the switching transistor T2 is connected to a switching signal terminal Gn. A first electrode of the switching transistor T2 is connected to a data signal line Vdata. A second electrode of the switching transistor T2 is connected to the first reset node M1. A gate of the first reset transistor T3 is connected to a first reset terminal Ref. A first electrode of the first reset transistor T3 is connected to and receives a first reference potential Vref. A second electrode of the first reset transistor T3 is connected to the first reset node M1. A gate of the driver transistor T1 is connected to the first reset node M1. A first electrode of the driver transistor T1 is connected to a constant-voltage high-level power supply VDD. A second electrode of the driver transistor T1 is connected to the second reset node M2. A gate of the second reset transistor T4 is connected to a second reset terminal Ini. A first electrode of the second reset transistor T4 is connected to and receives a second reference potential Vini. A second electrode of the second reset transistor T4 is connected to the second reset node M2. A first electrode of the first storage capacitor C1 is connected to the first reset node M1. A second electrode of the first storage capacitor C1 is connected to the second reset node M2.

The pixel circuit 20 further includes a light emitting device. An anode of the light emitting device is connected to the second reset node M2. A cathode of the light emitting device is connected to the constant voltage low-level power supply VSS. The light emitting device may be an organic light emitting diode, a light emitting diode (LED) device, or the like.

Since an operating current in the pixel circuit 20 is positively correlated with a difference between the potential of the gate of the driver transistor T1 and the potential of the source of the driver transistor T1. That is, the voltage difference between the potentials of the first reset node M1 and the second reset node M2 in FIG. 2. Therefore, in order to ensure the accuracy of the operation current in the sub-pixel unit 301, the potentials of the gate and the source of the driver transistor T1 are required to be reset to the corresponding reference potentials before operation, so as to ensure the accuracy of the operation current. The first reset transistor T3 and the second reset transistor T4 may be provided to solve the above-mentioned technical problem. However, the four transistors in FIG. 2 require three different control signals to control the turn-on of the transistors, while the gate driver circuit in the prior art outputs three control signals typically by using at least two different gate driver units arranged in the same row. The increased number of the gate driver units may cause the increased size of the frame of the display panel, which is contrary to the requirement for the narrow frame of the display panel.

Figure 3:
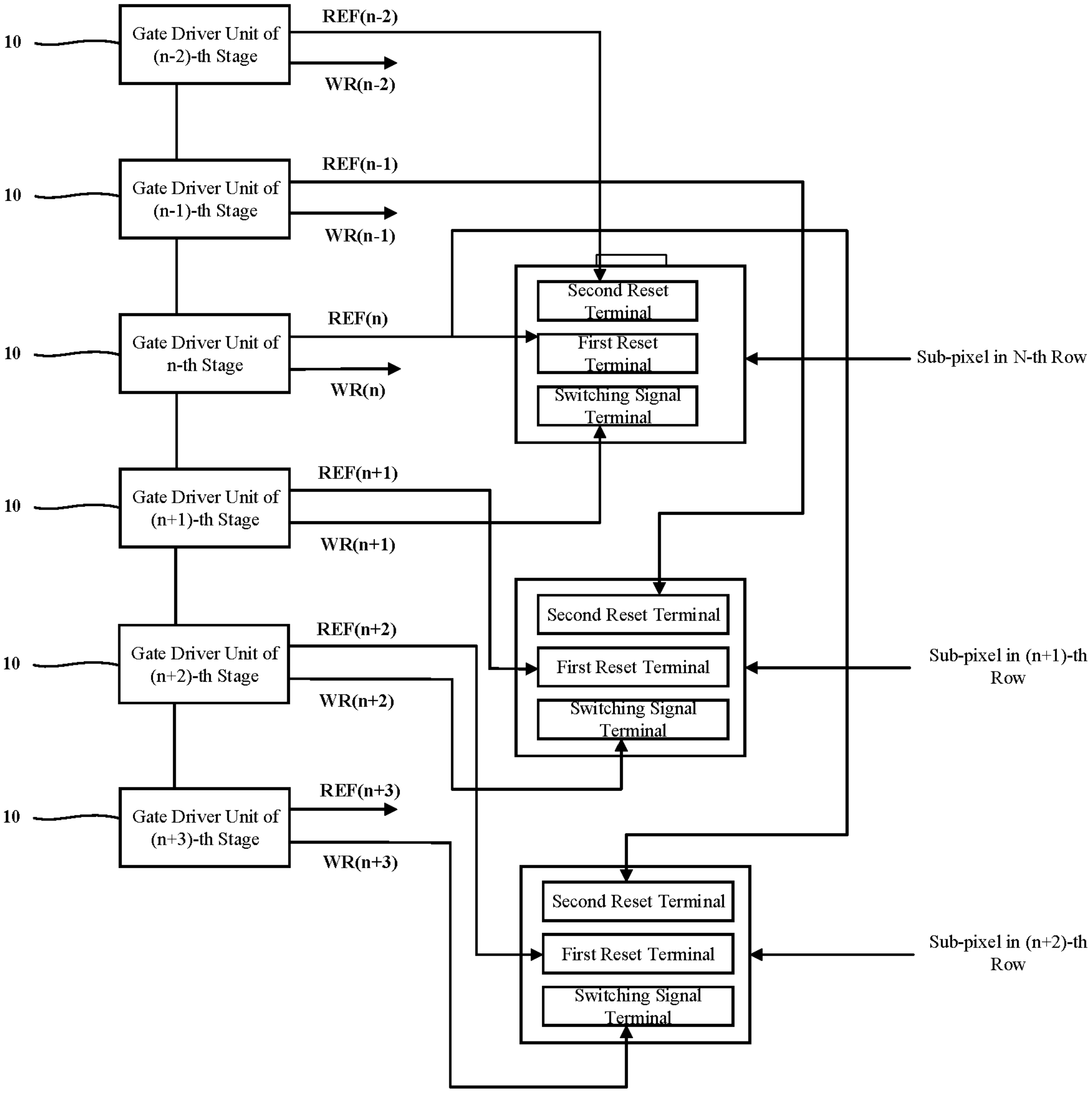
FIG. 3 is a connection diagram of a gate driver circuit and a pixel circuit according to an embodiment of the present disclosure.

Referring to FIGS. 1 and 3, the gate driver circuit 100 may include a plurality of gate driver units 10 connected in cascade. Each gate driver unit 10 includes a first signal output terminal REF(n) and a second signal output terminal WR(n). The gate of the switching transistor T2 of the pixel circuit 20 in a b-th row of the sub-pixel rows 310 is connected to the second signal output terminal WR(n) at an a-th stage. The gate of the first reset transistor T3 of the pixel circuit 20 in the b-th row of the sub-pixel rows 310 is connected to the first signal output terminal REF(n) at the b-th stage. The gate of the second reset transistor T4 of the pixel circuit 20 in the b-th row of the sub-pixel rows 310 is connected to the first signal output terminal REF(n) at the c-th stage, a is greater than b, b is greater than c, and a, b, and c are positive integers.

For example, in the pixel circuit 20 in an n-th row of the sub-pixel rows 310, the gate of the switching transistor T2 is connected to the second signal output terminal WR(n+1) at the (n+1)-th stage, the gate of the first reset transistor T3 is connected to the first signal output terminal REF(n) at the n-th stage, the gate of the second reset transistor T4 is connected to the first signal output terminal REF(n−2) at the (n−2)-th stage, and n is an integer greater than or equal to 3.

That is, in the configuration of FIG. 3, the first signal output terminal REF(n−2) at the (n−2)-th stage supplies a control signal to the gate of the second reset transistor T4 of the sub-pixel unit 301 in the n-th row, the first signal output terminal REF(n) at the n-th stage supplies a control signal to the gate of the first reset transistor T3 of the sub-pixel unit 301 in the n-th row, and the second signal output terminal WR(n+1) at the (n+1)-th stage supplies a control signal to the gate of the first reset transistor T3 of the sub-pixel unit 301 in the n-th row. Meanwhile, in the configuration of FIG. 3, the first signal output terminal REF(n−1) of the (n−1)-th stage supplies a control signal to the gate of the second reset transistor T4 of the sub-pixel unit 301 in the (n+1)-th row, the first signal output terminal REF(n+1) at the (n+1)-th stage supplies a control signal to the gate of the first reset transistor T3 of the sub-pixel unit 301 in the (n+1)-th row, and the second signal output terminal WR(n+2) of the (n+2)-th stage supplies a control signal to the gate of the first reset transistor T3 of the row sub-pixel unit 301 in the (n+1)-th row. Meanwhile, in the configuration of FIG. 3, the first signal output terminal REF(n) at the n-th stage supplies a control signal to the gate of the second reset transistor T4 of the sub-pixel unit 301 in the (n+2)-th row, the first signal output terminal REF(n+2) at the (n+2)-th stage supplies a control signal to the gate of the first reset transistor T3 of the sub-pixel unit 301 in the (n+2)-th row, and the second signal output terminal WR (n+3) at the (n+2)-th satge supplies a control signal to the gate of the first reset transistor T3 of the sub-pixel unit 301 in the (n+2)-th row.

That is, the first signal output terminal REF(n) at the n-th stage in FIG. 3 supplies the control signal to the gate of the first reset transistor T3 of the sub-pixel unit 301 in the n-th row and the control signal to the gate of the second reset transistor T4 of the sub-pixel unit 301 in the (n+2)-th row, so that at least one of the signal output terminals of the gate driver circuit 100 may supply two different control signals to the pixel circuit 20, thereby simplifying the configuration of the gate driver circuit 100.

In an embodiment of the present disclosure, one of the gate driver units connected to the gate of the second reset transistor is removed, and the control signal transmitted to the first reset transistor T3 is provided by the first signal output terminal REF(n) at the b-th stage in the gate driver circuit 100, and the control signal transmitted to the second reset transistor T4 is provided by the first signal output terminal REF(n) at the c-th stage. Thus, the configuration of the gate driver circuit 100 is simplified and the narrower frame is realized in the case that the pixel circuit 20 is operated normally.

Figure 4:
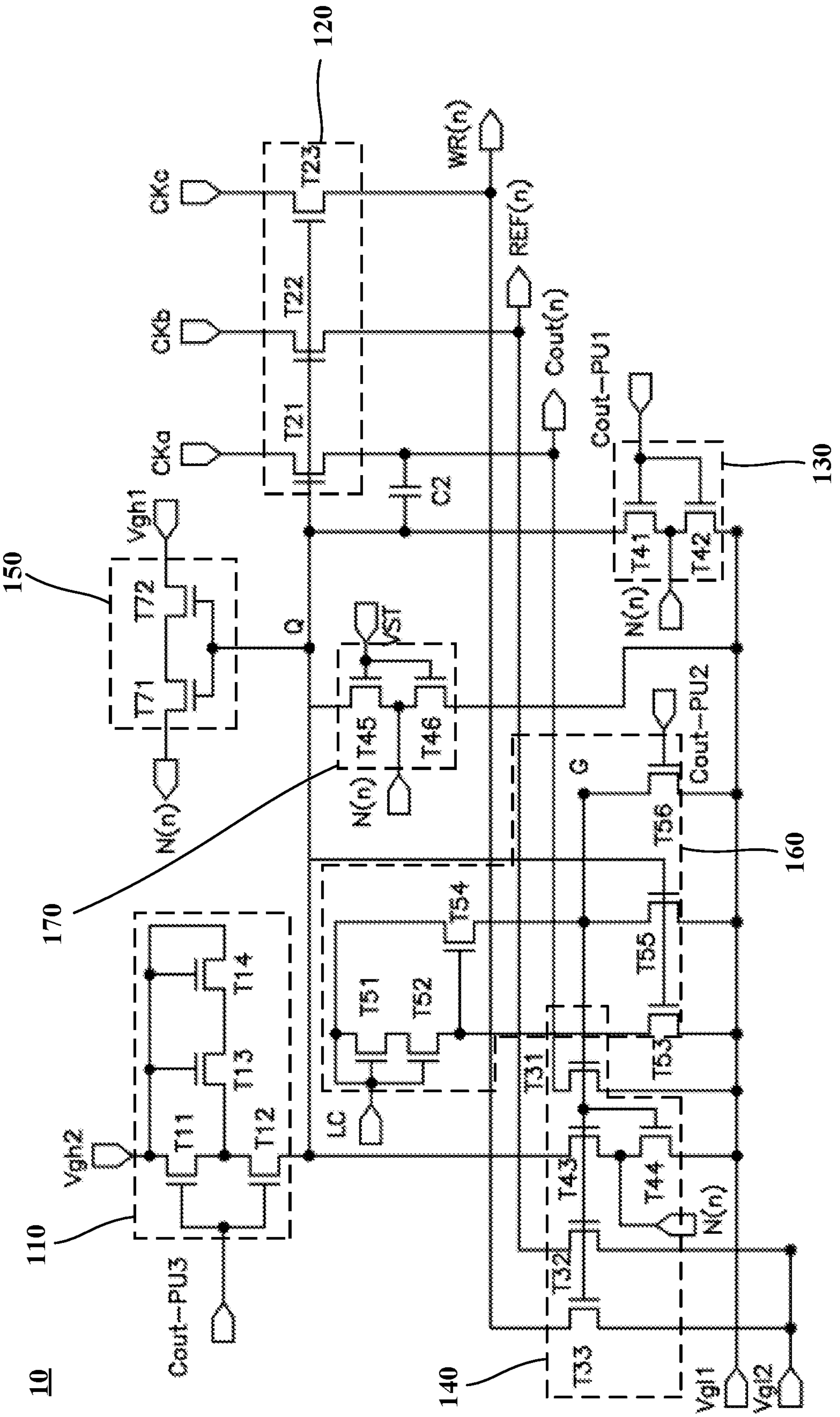
FIG. 4 is a circuit diagram of a gate driver unit in a gate driver circuit according to an embodiment of the present disclosure.

Referring to FIG. 4, the gate driver unit 10 of the n-th stage may include a pull-up control unit 110 configured to pull up the potential of the first node Q, a pull-up unit 120 configured to pull up the potentials of the first signal output terminal REF(n) and the second signal output terminal WR(n), a pull-down unit 130 configured to pull down the potential of the first node Q, a pull-down maintenance unit 140 configured to maintain the low-potential of the first node Q, and a compensation unit 170.

Referring to FIG. 4, the pull-up control unit 110 includes a first pull-up control transistor T11 and a second pull-up control transistor T12. A first electrode of the first pull-up control transistor T11 is connected to a second high potential line Vgh2. A second electrode of the first pull-up control transistor T11 is connected to a first electrode of the second pull-up control transistor T12. A second electrode of the second pull-up control transistor T12 is connected to a first node Q. A gate of the first pull-up control transistor T11 and a gate of the second pull-up control transistor T12 are connected to a third stage transmission signal line Cout-PU3.

Meanwhile, the pull-up control unit 110 may further include a third pull-up control transistor T13 and a fourth pull-up control transistor T14. A gate of the third pull-up control transistor T13 and a gate of the fourth pull-up control transistor T14 are connected to a second high potential line Vgh2. A first electrode of the third pull-up control transistor T13 is connected to the first electrode of the second pull-up control transistor T12. A second electrode of the third pull-up control transistor T13 is connected to a first electrode of the fourth pull-up control transistor T14. A second electrode of the fourth pull-up control transistor T14 is connected to the gate of the fourth pull-up control transistor T14.

Note that the first pull-up control transistor T11 and the second pull-up control transistor T12 is configured to reduce the leakage current in the pull-up control unit 110. The third pull-up control transistor T13 and the fourth pull-up control transistor T14 is configured so that when a low-level voltage is transmitted through the third stage transmission signal line Cout-PU3, the second electrode of the first pull-up control transistor T11 and the first electrode of the second pull-up control transistor T12 is maintained at a high potential, to avoid the turn-on of the first pull-up control transistor T11, thereby pulling up the potential of the first node Q.

In an embodiment, the first pull-up control transistor T11, the second pull-up control transistor T12, the third pull-up control transistor T13, and the fourth pull-up control transistor T14 may be turned on by a stage transmission signal transmitted through the third stage transmission signal line Cout-PU3. The potential of the first node Q is pulled up and a second storage capacitor C2 in the pull-up unit 120 is charged, by a signal of a high-level transmitted through the second high-potential line Vgh2.

Referring to FIG. 4, the pull-up unit 120 includes a first pull-up transistor T21, a second pull-up transistor T22, a third pull-up transistor T23, and the second storage capacitor C2. A first electrode of the first pull-up transistor T21 is connected to a first clock signal line CKa. A second electrode of the first pull-up transistor T21 is connected to a stage transmission signal terminal Cout(n). A first electrode of the second pull-up transistor T22 is connected to a second clock signal line CKb. A second electrode of the second pull-up transistor T22 is connected to the first signal output terminal REF(n). A first electrode of the third pull-up transistor T23 is connected to a third clock signal line CKc. A second electrode of the third pull-up transistor T23 is connected to the second signal output terminal WR(n). A gate of the first pull-up transistor T21, a gate of the second pull-up transistor T22, and a gate of the third pull-up transistor T23 are connected to the first node Q. A first electrode of the second storage capacitor C2 is connected to the first node Q, and the second electrode of the second storage capacitor C2 is connected to the stage transmission signal terminal Cout(n).

In an embodiment, a stage transmission signal is transmitted to the stage transmission signal line from the stage transmission signal terminal Cout(n), and a control signal is transmitted from the signal output terminal.

In an embodiment, the first pull-up transistor T21, the second pull-up transistor T22, and the third pull-up transistor T23 are turned on in response to a high potential of the first node Q. The second storage capacitor C2 is discharged to maintain the high potential of the first node Q. The stage transmission signal is transmitted to the stage transmission signal terminal Cout(n) through the first pull-up transistor T21 from the first clock signal line CKa. A first control signal is transmitted to the first signal output terminal REF(n) through the second pull-up transistor T22 from the second clock signal line CKb. A second control signal is transmitted to the second signal output terminal WR(n) through the third pull-up transistor T23 from the third clock signal line CKc.

Referring to FIG. 4, the gate driver unit 10 further includes a leakage prevention unit 150 connected to the first node Q, and an output terminal N(n) of the leakage prevention unit 150 is connected to the pull-down unit 130 and the pull-down maintenance unit 140.

The leakage prevention unit 150 includes a first leakage prevention transistor T71 and second leakage prevention transistor T72. A first electrode of the first leakage prevention transistor T71 is connected to a first high potential line Vgh1. A second electrode of the first leakage prevention transistor T71 is connected to a first electrode of the second leakage prevention transistor T72. A second electrode of the second leakage prevention transistor T72 is connected to the output terminal N(n) of the leakage prevention unit 150. A gate of the first leakage prevention transistor T71 and a gate of a second leakage prevention transistor T72 are connected to the first node Q.

In an embodiment, the first leakage-proof transistor T71 and the second leakage-proof transistor T72 is turned on in response to the high potential of the first node Q. A signal of the high-level is transmitted to the output terminal N(n) of the leakage prevention unit 150 through the first leakage prevention transistor T71 and the second leakage-proof transistor T72 from the first high potential line Vgh1.

Referring to FIG. 4, the pull-down unit 130 includes a first pull-down transistor T41 and a second pull-down transistor T42. A gate of the first pull-down transistor T41 and a gate of the second pull-down transistor T42 are connected to the first stage transmission signal line Cout-PU1. A first electrode of the first pull-down transistor T41 is connected to the first node Q. A second electrode of the first pull-down transistor T41 and a first electrode of the second pull-down transistor T42 are connected to the output terminal N(n) of the leakage prevention unit 150. A second electrode of the second pull-down transistor T42 is connected to a first low-potential line Vg11.

In an embodiment, a signal of the high potential is transmitted to the gate of the first pull-down transistor T41 and the gate of the second pull-down transistor T42 by the first stage transmission signal line Cout-PU1, to turn on the first pull-down transistor T41 and the second pull-down transistor T42. The first node Q is connected to the first low-potential line Vg11 through the first pull-down transistor T41 and the second pull-down transistor T42. The first low-potential line Vg11 pulls down the potential of the first node Q. The first pull-up transistor T21 and the second pull-up transistor T22 are turned off.

Referring to FIG. 4, the pull-down maintenance unit 140 includes a first pull-down maintenance transistor T31, a second pull-down maintenance transistor T32, a third pull-down maintenance transistor T43 and a fourth pull-down maintenance transistor T44, and a fifth pull-down maintenance transistor T33.

In an embodiment, a first electrode of the first pull-down maintenance transistor T31 is connected to the stage transmission signal terminal Cout(n). A second electrode of the first pull-down maintenance transistor T31 is connected to the first low-potential line Vg11. A first electrode of the second pull-down maintenance transistor T32 is connected to the first signal output terminal REF(n). A second electrode of the second pull-down maintenance transistor T32 is connected to the second low-potential line Vg12. A first electrode of the fifth pull-down maintenance transistor T33 is connected to the second signal output terminal WR(n). A second electrode of the fifth pull-down maintenance transistor T33 is connected to the second low-potential line Vg12. A first electrode of the third pull-down maintenance transistor T43 is connected to the first node Q. A second electrode of the third pull-down maintenance transistor T43 and a first electrode of the fourth pull-down maintenance transistor T44 are connected to the output terminal N(n) of the leakage prevention unit 150. A second electrode of the fourth pull-down maintenance transistor T44 is connected to the first low-potential line Vg11. A gate of the first pull-down maintenance transistor T31, a gate of the second pull-down maintenance transistor T32, a gate of the third pull-down maintenance transistor T43, a gate of the fourth pull-down maintenance transistor T44, and a gate of the fifth pull-down maintenance transistor T33 are all connected to the third node G.

Referring to FIG. 4, the gate driver unit 10 further includes an inverter 160 connected to the pull-down maintenance unit 140 via the third node G. The inverter 160 is configured to invert the potentials of the first node Q and the third node G. The inverter 160 includes a first inverter transistor T51, a second inverter transistor T52, a third inverter transistor T53, a fourth inverter transistor T54, a fifth inverter transistor T55, and a sixth inverter transistor T56.

In an embodiment, a first electrode of the first inverter transistor T51, a gate of the first inverter transistor T51, a gate of the second inverter transistor T52, and a first electrode of the fourth inverter transistor T54 are connected to a low-frequency clock signal line LC. A second electrode of the first inverter transistor T51 is connected to a first electrode of the second inverter transistor T52. A second electrode of the second inverter transistor T52 is connected to a first electrode of the third inverter transistor T53 and a gate of the fourth inverter transistor T54. A second electrode of the third inverter transistor T53 is connected to the first low-potential line Vg11. A second electrode of the fourth inverter transistor T54, a first electrode of the fifth inverter transistor T55, and a first electrode of the sixth inverter transistor T56 are connected to a second node P. A second electrode of the fifth inverter transistor T55 and a second electrode of the sixth inverter transistor T56 are connected to the first low-potential line Vg11. A gate of the third inverter transistor T53 and a gate of the fifth inverter transistor T55 are connected to the first node Q. A gate of the sixth inverter transistor T56 is connected to the second stage transmission signal line Cout-PU2.

In an embodiment, a signal of the high-level is transmitted to the first electrode of the first inverter transistor T51, the gate of the first inverter transistor T51, and the gate of the second inverter transistor T52 through the low frequency clock signal line LC, to turn on the first inverter transistor T51 and the second inverter transistor T52. A signal of the high-level is transmitted to the first electrode and the gate of the fourth inverter transistor T54 by the low frequency clock signal line LC, so that the fourth inverter transistor T54 is turned on. A signal of the high-level transmitted to the third node G by the low frequency clock signal line LC, and the potential of the third node G is pulled up to the high-level.

When the third node G is at a high-level, the first pull-down maintenance transistor T31, the second pull-down maintenance transistor T32, the third pull-down maintenance transistor T43, the fourth pull-down maintenance transistor T44, and the fifth pull-down maintenance transistor T33 are all turned on. The stage transmission signal terminal Cout(n) is connected to the first low-potential line Vg11 through the first pull-down maintenance transistor T31. The first signal output terminal REF(n) is connected to the second low-potential line Vg12 through the second pull-down maintenance transistor T32. The second signal output terminal WR(n) is connected to the second low-potential line Vg12 through the fifth pull-down maintenance transistor T33. A signal of the low-level is output from the stage transmission signal terminal Cout(n), the first signal output terminal REF(n), and the second signal output terminal WR(n). The first node Q is connected to the first low-potential line Vg11 through the third pull-down maintenance transistor T43 and the fourth pull-down maintenance transistor T44 to maintain the potential of the first node Q at the low level.

In an embodiment, one of the first inverter transistor T51 and the second inverter transistor T52 may be provided in the gate driver unit 10. The first inverter transistor T51 and the second inverter transistor T52 may configured to reduce the leakage current. The sixth inverter transistor T56 may be configured to provide a feedback signal, which may not be a portion of the inverter 160.

Referring to FIG. 4, the gate driver unit 10 further includes a global reset unit 170 connected to the first node Q and configured to pull down the potential of the first node Q.

In an embodiment, the global reset unit 170 includes a first reference transistor T45 and a second reference transistor T46. A first electrode of the first reference transistor T45 is connected to the first node Q. A second electrode of the first reference transistor T45 and a first electrode of the second reference transistor T46 are connected to the output terminal N(n) of the leakage prevention unit 150. A second electrode of the second reference transistor T46 is connected to the first low-potential line Vg11. Gates of the first reference transistor T45 and the second reference transistor T46 are connected to a control signal line VST.

In an embodiment, a signal of the high-level is output to the gate of the first reference transistor T45 and the gate of the second reference transistor T46 from the control signal line VST. Therefore, the first reference transistor T45 and the second reference transistor T46 are turned on. The first node Q is connected to the first low-potential line Vg11 through the first reference transistor T45 and the second reference transistor T46. The potential of the first node Q is pulled low.

It should be noted that the global reset unit 170 generally resets the potential of the first node Q when the gate driver unit 10 terminates the operation thereof or starts the operation thereof.

The potential of the second low-potential line Vg12 may be greater than the potential of the first low-potential line Vg11. For example, if the potential of the second low-potential line Vg12 may be −8V and the potential of the first low-potential line Vg11 may be −10V, the potential of the first node Q is pulled down to −8V, the potential of the first signal output terminal REF(n) and the potential of the second signal output terminal WR(n) are pulled down to −10V. The first node Q may be used as the gate of the second pull-up transistor T22 and the third pull-up transistor T23. The first signal output terminal REF(n) may be used as the source terminal of the second pull-up transistor T22. The second signal output terminal WR(n) may be used as the source terminal of the third pull-up transistor T23. The potential difference between potentials of the gate and the source of the second pull-up transistor T22 is −2V, which is far less than a threshold voltage of the second pull-up transistor T22. The second pull-up transistor T22 may be completely turned off. Therefore, the second pull-up transistor T22 is prevented from being turned on and outputting a control signal when the row related to the second pull-up transistor T22 is not selected to be enabled. The third pull-up transistor T23 may be completely turned off. The third pull-up transistor T23 is prevented from being turned on to output a control signal when the row related to the third pull-up transistor T23 is not selected to be enabled.

The voltages transmitted through the first low-potential line Vg11 may be same as the second low-potential line Vg12. That is, the first low-potential line Vg11 and the second low-potential line Vg12 may be the same signal line to simplify the arrangement of the signal lines.

The potential of the first high potential line Vgh1 may be same as the second high potential line Vgh2 in an embodiment of the present disclosure. That is, the first high potential line Vgh1 and the second high potential line Vgh2 may be the same signal line to simplify the arrangement of the signal lines.

The second stage transmission signal line Cout-PU2 and the third stage transmission signal line Cout-PU3 may be a stage transmission signal output from a stage transmission signal terminal Cout(n) at a stage before the current stage. For example, the second stage transmission signal line Cout-PU2 and the third stage transmission signal line Cout-PU3 may be a stage transmission signal output from the stage transmission signal terminal Cout(n) of the gate driver circuit 100 of the (n−x)-th stage (x may be 2). The first stage transmission signal line Cout-PU1 may be a stage transmission signal output from a stage transmission signal terminal Cout(n) at a stage after the current stage. For example, the first stage transmission signal line Cout-PU1 may be a stage transmission signal output from the stage transmission signal terminal Cout(n) of the gate driver circuit 100 of the (n+y)-th stage (y may be 5).

The second electrode of the first pull-down transistor T41 and the first electrode of the second pull-down transistor T42 in the pull-down unit 130, the second electrode of the first reference transistor T45 and the first electrode of the second reference transistor T46 in the global reset unit 170, and the second electrode of the third pull-down maintenance transistor T43 and the first electrode of the fourth pull-down maintenance transistor T44 in the pull-down maintenance unit 140 are all connected to the output terminal N(n) of the leakage prevention unit 150. Since a signal of the high-level is transmitted from the output terminal N(n) of the leakage prevention unit 150, even if the threshold voltage of the above transistor (e.g., T41, T42, T45, T46, T43, and/or T44) is a negatively biased voltage, it is possible to ensure that the voltage difference between the gate voltage and the source voltage of the above transistor is less than the threshold voltage of the above transistor. Therefore, it is possible to avoid leakage of the potential of the first node Q due to abnormal turn-on of the transistors in the pull-down unit 130, the pull-down maintenance unit 140, and the global reset unit 170, thereby ensuring stability of the potential of the first node Q.

Although the output terminal N(n) in FIG. 4 includes a plurality of connection terminals, in practice, the plurality of connection terminals of the output terminal N(n) are one connection point. For convenience of illustration and description, the output terminal N(n) is shown as a plurality of connection terminals in the circuit diagram, and in practice, the plurality of connection terminals are the same point.

It should be noted that in FIG. 4, a dot marked with black dots indicates that two lines arranged in an intersection are conductive at that point. Not all conductive points are marked in FIG. 4, and the actual connection (or conductive points) is set forth in the following embodiment.

It should be noted that the structure of the gate driver unit in FIG. 4 is one of embodiments of the present disclosure, so long as the gate driver unit outputting two different control signals at the same stage is applicable to the present disclosure.

Figure 5:
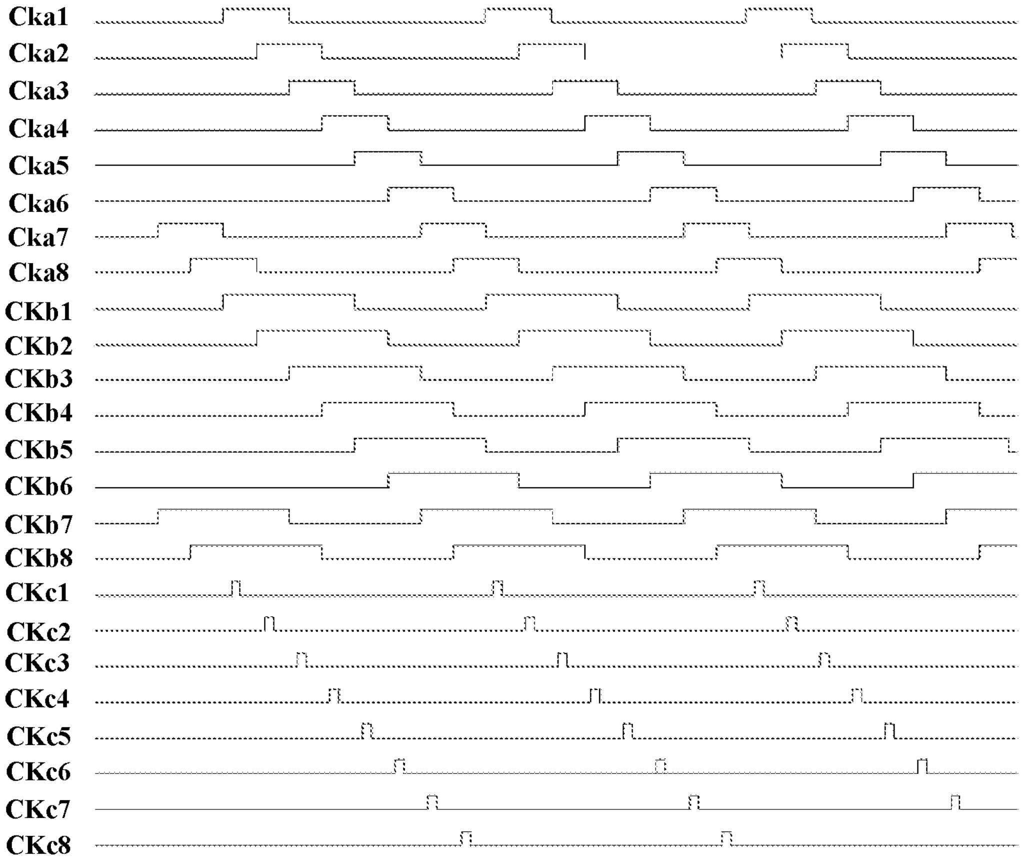
FIG. 5 is a timing diagram of a first clock signal line, a second clock signal line, and a third clock signal line in FIG. 4.
Figure 6:
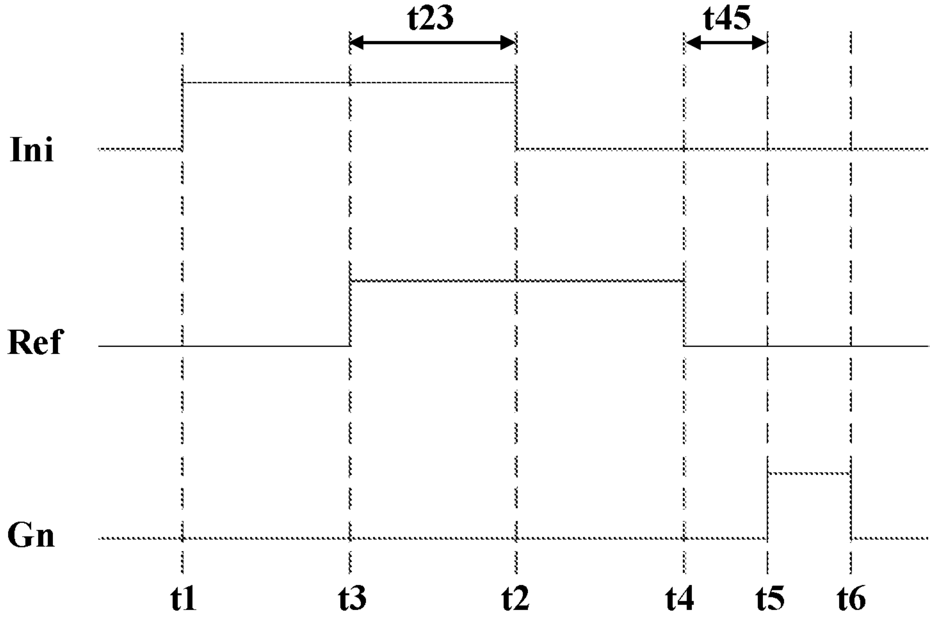
FIG. 6 is a timing diagram of the switching signal terminal, the first reset terminal and the second reset terminal of FIG. 2.

Referring to FIGS. 5 and 6, FIG. 5 is a timing diagram of the first clock signal line CKa, the second clock signal line CKb, and the third clock signal line CKc in FIG. 4, and FIG. 6 is a timing diagram of the switching signal terminal Gn, the first reset terminal Ref, and the second reset terminal Ini in FIG. 2.

In the configuration of FIG. 4, the first clock signal line CKa is connected to the stage transmission signal terminal. The second clock signal line CKb is connected to the first signal output terminal REF(n). The third clock signal line CKc is connected to the second signal output terminal WR(n). In the pixel circuit 20, the first signal output terminal REF(n) is connected to the second clock signal line CKb. That is, the first control signal output from the second clock signal line CKb is shared by the first reset transistor T3 and the second reset transistor T4, and an original wide pulse driver circuit is removed, so that a wide pulse signal may be output through the second clock signal line CKb. That is, the pulse width of the clock signal output from the second clock signal line CKb is greater than the pulse width of the clock signal output from the first clock signal line CKa and the second clock signal line CKb.

The third clock signal line CKc is connected to the second signal output terminal WR(n), that is, the clock signal output from the third clock signal line CKc is received by the switching transistor T2 and is used to turn on the switching transistor T2, so that the pulse width of the clock signal output from the third clock signal line CKc is minimum, and the pulse width of the clock signal output from the third clock signal line CKc is less than the pulse width of the clock signal output from the first clock signal line CKa, that is, the pulse width of the first control signal is greater than the pulse width of the second control signal.

The first control signal is used to reset the potentials of the first reset node M1 and the second reset node M2 in the pixel circuit 20. The first control signal received by the first reset node M1 has a certain phase difference with respect to the first control signal received by the second reset node M2. However, the first reset node M1 and the second reset node M2 may be reset at the same time in order to ensure the reset accuracy of the potentials of the first reset node M1 and the second reset node M2.

In the display panel 200 in an embodiment of the present disclosure, within one scan frame of the gate driver circuit 100, the start time of the first control signal of the b-th stage is between the start time and the end time of the first control signal of the c-th stage, and the start time of the second control signal of the a-th stage is after the end time of the first control signal of the b-th stage.

For example, in the configuration of FIG. 6, the second control signal of the a-th stage received by the switching signal terminal Gn may be the second control signal of the (n+1)-th stage, the first control signal of the b-th stage received by the first reset terminal Ref may be the first control signal of the n-th stage, and the first control signal of the c-th stage received by the second reset terminal Ini may be the first control signal of the (n−2)-th stage. The first control signal of the second reset terminal Ini has a start time t1 and an end time t2. The first control signal of the first reset terminal Ref has a start time t3 and an end time t4. The second control signal of the switching signal terminal Gn has a start time t5 and an end time t6. The pulse width of the first control signal transmitted through the second reset terminal Ini overlaps the pulse width of the first control signal transmitted through the first reset terminal Ref during a first time period t23, that is, a time period between the time t3 and the time t2. The first time period t23 is a period during which the first reset node M1 and the second reset node M2 are reset commonly.

In an embodiment, since the duration of the first time period t23 is positively related to the accuracy of the operating current in the pixel circuit 20, the duration of the first time period t23 is expected to be as long as possible. Meanwhile, the duration of the first time period t23 may be greater than the pulse width of the second control signal. For example, the duration of the first time period t23 may be twice the pulse width of the second control signal, so that the potentials of both the first reset node M1 and the second reset node M2 may be reset to the reference potential.

In an embodiment, the time period between the start time t5 of the second control signal at the a-th stage and the end time t4 of the first control signal at the b-th stage is the second time period t45, that is, a time period between the time t4 and the time t5. The duration of the second time period t45 is less than or equal to the pulse width of the second control signal.

In the pixel circuit 20 in an embodiment of the present disclosure, after the potential of the first reset node M1 is reset, the potential of the first reset node M1 and the potential of the second reset node M2 are both at an ideal reference potential, and then the second control signal is output to the switching signal terminal Gn. Since the pulse width of the second control signal is less, the size of the duration of the second time period t45 may be same as the pulse width of the second control signal.

In an embodiment, the number of gate driver units 10 may be greater than the number of sub-pixel rows 310.

Figure 7:
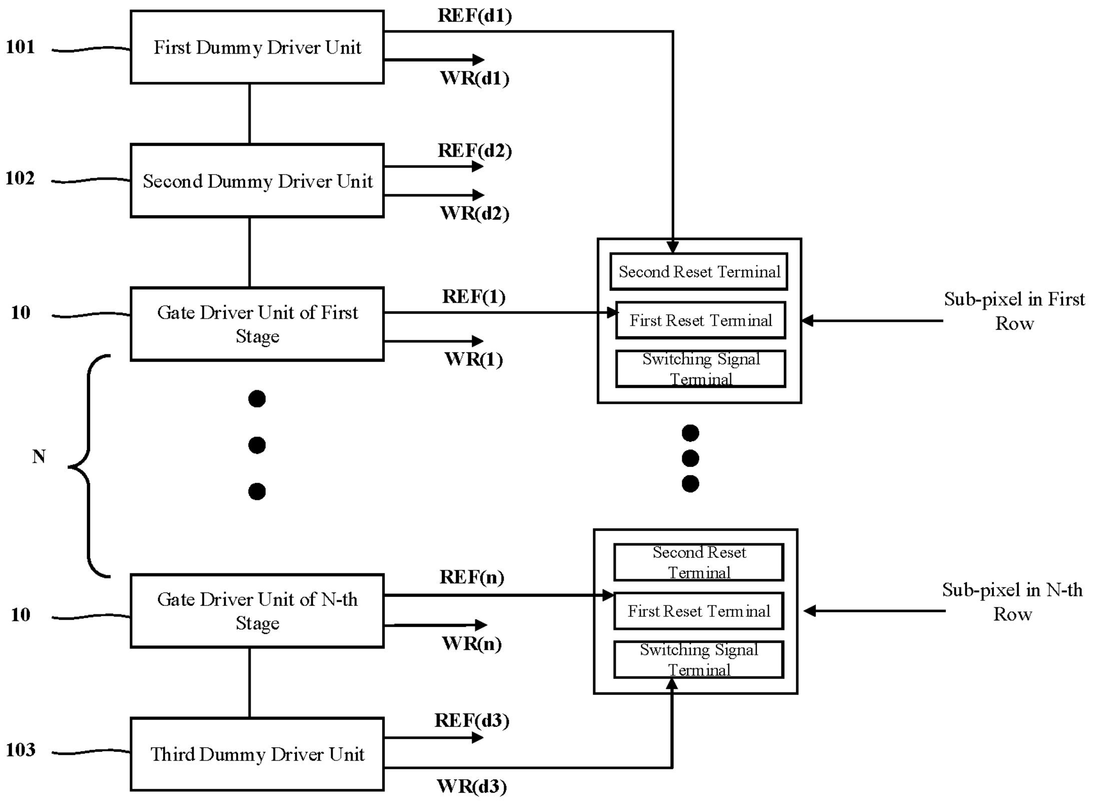
FIG. 7 is a second connection diagram of the gate drive circuit and the pixel circuit of an embodiment of the present disclosure.

For example, in the structure of FIG. 7, the gate driver circuit 100 includes a first dummy driver unit 101, a second dummy driver unit 102, a third dummy driver unit 103, and n gate driver units 10 connected in cascade. The n gate driver units 10 are disposed between the second dummy driver unit 102 and the third dummy driver unit 103. The first dummy driver unit 101, the second dummy driver unit 102, and the third dummy driver unit 103 all are included in the gate driver unit 10, but do not correspond to the sub-pixel rows 310. For example, the first dummy driver unit 101 is at a first stage of the gate driver circuit 100, the second dummy driver unit 102 is at a second stage of the gate driver circuit 100, the third dummy driver unit 103 is at the last stage of the gate driver circuit 100, and the n gate driver units 10 respectively correspond to the n sub-pixel rows 310.

In this embodiment, the first signal output terminal REF (d1) of the first dummy driver unit 101 is connected to the gate of the second reset transistor T4 of the pixel circuit 20 of the first row of the sub-pixel rows 310. The first signal output terminal REF(d2) of the second dummy driver unit 102 is connected to the gate of the second reset transistor T4 of the pixel circuit 20 of the second row of the sub-pixel rows 310. The second signal output terminal WR(d3) of the third dummy driver unit 103 is connected to the gate of the first reset transistor T3 of the pixel circuit 20 of the n-th row of the sub-pixel rows 310.

For example, the first signal output terminal REF(d1) of the first dummy driver unit 101 supplies a control signal to the gate of the second reset transistor T4 of the sub-pixel unit 301 in the first row. The first signal output terminal REF(1) of the gate driver unit 10 at the first stage supplies a control signal to the gate of the first reset transistor T3 of the sub-pixel unit 301 in the first row. The second signal output terminal WR(2) of the gate driver unit 10 at the second stage supplies a control signal to the gate of the first reset transistor T3 of the row sub-pixel unit 301 in the first row. The first signal output terminal REF(d2) of the second dummy driver unit 102 supplies a control signal to the gate of the second reset transistor T4 of the sub-pixel unit 301 in the second row. The first signal output terminal REF(2) of the gate driver unit 10 at the second stage supplies a control signal to the gate of the first reset transistor T3 of the sub-pixel unit 301 in the second row. The second signal output terminal WR(3) of the gate driver unit 10 at the third stage supplies a control signal to the gate of the first reset transistor T3 of the sub-pixel unit 301 in the third row. The first signal output terminal REF(n−2) of the gate driver unit 10 at the (n−2)-th stage supplies a control signal to the gate of the second reset transistor T4 of the sub-pixel unit 301 in the n-th row. The first signal output terminal REF(n) of the gate driver unit 10 at the n-th stage supplies a control signal to the gate of the first reset transistor T3 of the sub-pixel unit 301 in the n-th row. The second signal output terminal WR (d3) of the third dummy driver unit 103 supplies a control signal to the gate of the first reset transistor T3 of the sub-pixel unit 301 in the n-th row.

That is, the first dummy driver unit 101 supplies a control signal only to the gate of the second reset transistor T4 of the sub-pixel unit 301 in the first row. The second dummy driver unit 102 supplies a control signal only to the gate of the second reset transistor T4 of the sub-pixel unit 301 in the second row. The third dummy driver unit 103 supplies a control signal only to the gate of the first reset transistor T3 of the sub-pixel unit 301 in the n-th row.

FIG. 7 is one of the embodiments of the present disclosure. The present disclosure is not limited hereto, as long as the timing received by the switching signal terminal Gn, the first reset terminal Ref, and the second reset terminal Ini in the pixel driver circuit satisfy the timing diagram in FIG. 5.

The present disclosure also provides a display device including a terminal main body and the display panel. The terminal main body and the display panel are integrated. The terminal main body may be a circuit board or the like bonded to the display panel, a cover plate or the like covered on the display panel. The display device may include an electronic device such as a mobile phone, a television, or a notebook computer.

In the above-mentioned embodiments, the description of each embodiment has its own emphasis, and parts not described in detail in a certain embodiment may be referred to the related description of other embodiments.

The present disclosure has been described in detail with reference to a display panel and a display device according to an embodiment of the present disclosure. The principles and embodiments of the present disclosure have been described with reference to specific examples.

The description of the above embodiments is merely provided to help understand the technical solution and the core idea of the present disclosure. It will be appreciated by those of ordinary skill in the art that modifications may still be made to the technical solutions described in the foregoing embodiments, or equivalents may be made to some of the technical features therein. These modifications or substitutions do not depart from the scope of the technical solutions of the embodiments of the present disclosure.

What is claimed is:

1. A display panel comprising a display portion and a gate driver circuit located at a side of the display portion, wherein the display portion comprises a plurality of sub-pixel rows, each of the plurality of sub-pixel rows comprises a plurality of sub-pixel units, and a pixel circuit is provided in each of the plurality of sub-pixel units, wherein each of the pixel circuits comprises a switching transistor, a driver transistor, a first reset transistor and a second reset transistor, the switching transistor is connected to the driver transistor via a first reset node, the first reset transistor is connected to the driver transistor via the first reset node, and the second reset transistor is connected to the driver transistor via a second reset node, wherein the gate driver circuit comprises a plurality of gate driver units connected in cascade, each of the plurality of gate driver units comprises a first signal output terminal and a second signal output terminal, a gate of the switching transistor of the pixel circuit in a b-th row of the sub-pixel rows is connected to the second signal output terminal of the gate driver unit at an a-th stage, a gate of the first reset transistor of the pixel circuit in the b-th row of the sub-pixel rows is connected to the first signal output terminal of the gate driver unit at a b-th stage, and a gate of the second reset transistor of the pixel circuit in the b-th row of the sub-pixel rows is connected to the first signal output terminal of the gate driver unit at a c-th stage;

wherein a is greater than b, b is greater than c, and a, b, and c are positive integers, wherein a first control signal is output from the first signal output terminal and a second control signal is output from the second signal output terminal, and wherein in one of scan frames of the gate driver circuit, a start time of the first control signal of the gate driver unit at the b-th stage is between a start time and an end time of the first control signal of the gate driver unit at the c-th stage, and a start time of the second control signal of the gate driver unit at the a-th stage is after an end time of the first control signal of the gate driver unit at the b-th stage.

2. The display panel according to claim 1, wherein a pulse width of the first control signal is greater than a pulse width of the second control signal.

3. The display panel according to claim 1, wherein a time period between the start time of the first control signal of the gate driver unit at the b-th stage and the end time of the first control signal of the gate driver unit at the c-th stage is a first time period, and a duration of the first time period is greater than a pulse width of the second control signal.

4. The display panel according to claim 1, wherein the plurality of gate driver units further comprises a first dummy driver unit and a second dummy driver unit located before the gate driver unit at a first stage;

wherein a first signal output terminal of the first dummy driver unit is connected to the gate of the second reset transistor of the pixel circuit in a first row of the sub-pixel rows, and a first signal output terminal of the second dummy driver unit is connected to the gate of the second reset transistor of the pixel circuit in a second row of the sub-pixel rows.

5. The display panel according to claim 1, wherein a time period between the start time of the second control signal of the gate driver unit at the a-th stage and the end time of the first control signal of the gate driver unit at the b-th stage is a second time period, and a duration of the second time period is less than or equal to a pulse width of the second control signal.

6. The display panel according to claim 1, wherein the gate driver unit comprises:

a pull-up control unit connected to the first node and configured to pull up a potential of the first node;

a pull-up unit, wherein a terminal of the pull-up unit is connected to the first node, other terminal of the pull-up unit is connected to the first signal output terminal and the second signal output terminal, and the pull-up unit is configured to pull up potentials of the first signal output terminal and the second signal output terminal;

a pull-down unit connected to the first node and configured to pull down the potential of the first node;

a pull-down maintenance unit, wherein a terminal of the pull-down maintenance unit is connected to the first node, other terminal of the pull-down maintenance unit is connected to the first signal output terminal and the second signal output terminal, and the pull-down maintenance unit is configured to maintain a low-potential of the first node and pull down the potentials of the first signal output terminal and the second signal output terminal.

7. The display panel according to claim 6, wherein the first node is connected to a first low-potential line through the pull-down unit, and the first signal output terminal and the second signal output terminal are connected to a second low-potential line through the pull-down maintenance unit;

wherein a potential of the first low-potential line is less than a potential of the second low-potential line.

8. The display panel according to claim 6, wherein the pull-up unit comprises a first pull-up transistor, a second pull-up transistor, and a third pull-up transistor, wherein the first pull-up transistor, the second pull-up transistor and the third pull-up transistor are all connected to the first node, a first electrode of the first pull-up transistor is connected to a first clock signal line, a second electrode of the first pull-up transistor is connected to a stage transmission signal terminal, a first electrode of the second pull-up transistor is connected to a second clock signal line, a second electrode of the second pull-up transistor is connected to the first signal output terminal, a first electrode of the third pull-up transistor is connected to a third clock signal line, and a second electrode of the third pull-up transistor is connected to the third signal output terminal, and wherein a pulse width of a clock signal output by the first clock signal line is less than a pulse width of a clock signal output by the second clock signal line, and a pulse width of a clock signal output by the third clock signal line is less than a pulse width of a clock signal output by the first clock signal line.

9. A display device comprising a display panel, wherein the display panel comprises a display portion and a gate driver circuit located at a side of the display portion, the display portion comprises a plurality of sub-pixel rows, each of the plurality of sub-pixel rows comprises a plurality of sub-pixel units, and a pixel circuit is provided in each of the plurality of sub-pixel units Wherein each of the pixel circuits comprises a switching transistor, a driver transistor, a first reset transistor and a second reset transistor, the switching transistor is connected to the driver transistor via a first reset node, the first reset transistor is connected to the driver transistor via the first reset node, and the second reset transistor is connected to the driver transistor via a second reset node, wherein the gate driver circuit comprises a plurality of gate driver units connected in cascade, each of the plurality of gate driver units comprises a first signal output terminal and a second signal output terminal, a gate of the switching transistor of the pixel circuit in a b-th row of the sub-pixel rows is connected to the second signal output terminal of the gate driver unit at an a-th stage, a gate of the first reset transistor of the pixel circuit in the b-th row of the sub-pixel rows is connected to the first signal output terminal of the gate driver unit at a b-th stage, and a gate of the second reset transistor of the pixel circuit in the b-th row of the sub-pixel rows is connected to the first signal output terminal of the gate driver unit at a c-th stage;

wherein a is greater than b, b is greater than c, and a, b, and c are positive integers, wherein a first control signal is output from the first signal output terminal and a second control signal is output from the second signal output terminal, and wherein in one of scan frames of the gate driver circuit, a start time of the first control signal of the gate driver unit at the b-th stage is between a start time and an end time of the first control signal of the gate driver unit at the c-th stage, and a start time of the second control signal of the gate driver unit at the a-th stage is after an end time of the first control signal of the gate driver unit at the b-th stage.

10. The display device according to claim 9, wherein a pulse width of the first control signal is greater than a pulse width of the second control signal.

11. The display device according to claim 9, wherein a time period between the start time of the first control signal of the gate driver unit at the b-th stage and the end time of the first control signal of the gate driver unit at the c-th stage is a first time period, and a duration of the first time period is greater than a pulse width of the second control signal.

12. The display device according to claim 9, wherein the plurality of gate driver units further comprises a first dummy driver unit and a second dummy driver unit located before the gate driver unit at a first stage;

wherein a first signal output terminal of the first dummy driver unit is connected to the gate of the second reset transistor of the pixel circuit in a first row of the sub-pixel rows, and a first signal output terminal of the second dummy driver unit is connected to the gate of the second reset transistor of the pixel circuit in a second row of the sub-pixel rows.

13. The display device according to claim 9, wherein a time period between the start time of the second control signal of the gate driver unit at the a-th stage and the end time of the first control signal of the gate driver unit at the b-th stage is a second time period, and a duration of the second time period is less than or equal to a pulse width of the second control signal.

14. The display device according to claim 9, wherein the gate driver unit comprises:

a pull-up control unit connected to the first node and configured to pull up a potential of the first node;

a pull-up unit, wherein a terminal of the pull-up unit is connected to the first node, other terminal of the pull-up unit is connected to the first signal output terminal and the second signal output terminal, and the pull-up unit is configured to pull up potentials of the first signal output terminal and the second signal output terminal;

a pull-down unit connected to the first node and configured to pull down the potential of the first node;

a pull-down maintenance unit, wherein a terminal of the pull-down maintenance unit is connected to the first node, other terminal of the pull-down maintenance unit is connected to the first signal output terminal and the second signal output terminal, and the pull-down maintenance unit is configured to maintain a low-potential of the first node and pull down the potentials of the first signal output terminal and the second signal output terminal.

15. The display device according to claim 14, wherein the first node is connected to a first low-potential line through the pull-down unit, and the first signal output terminal and the second signal output terminal are connected to a second low-potential line through the pull-down maintenance unit;

wherein a potential of the first low-potential line is less than a potential of the second low-potential line.

16. The display device according to claim 14, wherein the pull-up unit comprises a first pull-up transistor, a second pull-up transistor, and a third pull-up transistor, wherein the first pull-up transistor, the second pull-up transistor and the third pull-up transistor are all connected to the first node, a first electrode of the first pull-up transistor is connected to a first clock signal line, a second electrode of the first pull-up transistor is connected to a stage transmission signal terminal, a first electrode of the second pull-up transistor is connected to a second clock signal line, a second electrode of the second pull-up transistor is connected to the first signal output terminal, a first electrode of the third pull-up transistor is connected to a third clock signal line, and a second electrode of the third pull-up transistor is connected to the third signal output terminal, and wherein a pulse width of a clock signal output by the first clock signal line is less than a pulse width of a clock signal output by the second clock signal line, and a pulse width of a clock signal output by the third clock signal line is less than a pulse width of a clock signal output by the first clock signal line.

* * * * *